(12) United States Patent
DeWitt, Jr. et al.

(10) Patent No.: US 9,323,578 B2
(45) Date of Patent: Apr. 26, 2016

(54) ANALYZING WAIT STATES IN A DATA PROCESSING SYSTEM

(75) Inventors: Jimmie Earl DeWitt, Jr., Georgetown, TX (US); Riaz Y. Hussain, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1468 days.

(21) Appl. No.: 11/754,575

(22) Filed: May 29, 2007

(65) Prior Publication Data

US 2007/0220515 A1    Sep. 20, 2007

Related U.S. Application Data

(63) Continuation-in-part of application No. 11/335,798, filed on Jan. 19, 2006, now Pat. No. 7,474,991, and a continuation-in-part of application No. 11/420,068, filed on May 24, 2006, now Pat. No. 7,900,196.

(51) Int. Cl.
*G06F 9/46* (2006.01)
*G06F 9/50* (2006.01)
*G06F 11/36* (2006.01)

(52) U.S. Cl.
CPC .......... *G06F 9/505* (2013.01); *G06F 11/3612* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 5,691,920 | A | 11/1997 | Levine et al. |
| 6,049,798 | A | 4/2000 | Bishop et al. |
| 6,193,422 | B1 | 2/2001 | Belt et al. |
| 6,434,714 | B1 | 8/2002 | Lewis et al. |
| 6,587,432 | B1 | 7/2003 | Putzolu et al. |
| 6,587,967 | B1 | 7/2003 | Bates et al. |
| 6,593,940 | B1 | 7/2003 | Petersen et al. |
| 7,233,991 | B2 | 6/2007 | Adhikari |
| 7,474,991 | B2 | 1/2009 | DeWitt, Jr. et al. |
| 7,624,395 | B2 | 11/2009 | Dostert |
| 7,900,196 | B2 | 3/2011 | DeWitt, Jr. et al. |
| 7,925,473 | B2 | 4/2011 | DeWitt, Jr. et al. |
| 2003/0114949 | A1* | 6/2003 | Armstrong et al. ........... 700/107 |
| 2004/0024797 | A1 | 2/2004 | Berry et al. |
| 2004/0078691 | A1 | 4/2004 | Cirne et al. |
| 2004/0194077 | A1* | 9/2004 | Bharadwaj et al. ........... 717/158 |

(Continued)

FOREIGN PATENT DOCUMENTS

EP    0679995 A1    11/1995

OTHER PUBLICATIONS

Alexander et al., "A Unifying Approach to Performance Analysis in the Java Environment", IBM Systems Journal vol. 39, No. 1, 2000, pp. 118-134.

(Continued)

*Primary Examiner* — Mengyao Zhe
(74) *Attorney, Agent, or Firm* — Yee & Associates, P.C.; Parashos Kalaitzis

(57) ABSTRACT

A computer implemented method, apparatus, and computer usable program code for collecting information about threads. A thread entering a wait state is detected. Information is selectively obtained about a set of threads in the wait state using a policy to produce an action in response to the thread entering the wait state. A history containing the collected data may be saved and used to determine changes to patterns.

28 Claims, 11 Drawing Sheets

(56) References Cited

U.S. PATENT DOCUMENTS

| | | |
|---|---|---|
| 2005/0071611 A1 | 3/2005 | DeWitt, Jr. et al. |
| 2005/0155022 A1 | 7/2005 | DeWitt, Jr. et al. |
| 2005/0289307 A1 | 12/2005 | Achanta et al. |
| 2007/0180102 A1 | 8/2007 | DeWitt et al. |
| 2007/0277157 A1 | 11/2007 | DeWitt et al. |
| 2008/0148240 A1 | 6/2008 | Jones et al. |
| 2009/0083002 A1 | 3/2009 | DeWitt, Jr. et al. |

OTHER PUBLICATIONS

U.S. Appl. No. 11/420,068, filed May 24, 2006, DeWitt, Jr. et al.

U.S. Appl. No. 11/335,798, filed Jan. 19, 2006, DeWitt, Jr. et al.

Office Action, dated Nov. 28, 2007, regarding U.S. Appl. No. 11/335,798, 10 pages.

Office Action, dated May 23, 2008, regarding U.S. Appl. No. 11/335,798, 8 pages.

Notice of Allowance, dated Sep. 2, 2008, regarding U.S. Appl. No. 11/335,798, 7 pages.

Office Action, dated Sep. 27, 2010, regarding U.S. Appl. No. 12/328,649, 13 pages.

Notice of Allowance, dated Dec. 7, 2010, regarding U.S. Appl. No. 12/328,649, 8 pages.

Office Action, dated May 14, 2010, regarding U.S. Appl. No. 11/420,068, 10 pages.

Notice of Allowance, dated Oct. 27, 2010, regarding U.S. Appl. No. 11/420,068, 4 pages.

* cited by examiner

ANALYZING WAIT STATES IN A DATA PROCESSING SYSTEM

This application is a continuation-in-part application of U.S. application Ser. No. 11/335,798, filed Jan. 19, 2006, now U.S. Pat. No. 7,474,991 and is a continuation-in-part application of U.S. application Ser. No. 11/420,068, filed May 24, 2006.

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for analyzing the performance of a data processing system.

2. Description of the Related Art

In designing and writing code for applications, one objective is for the application to scale well when more than one processor is used. A complex application, such as, WebSphere™ Application Server, may support many different transactions. It is important that this application be able to take advantage of multiple threads and multiple processors. When the work load increases, an application that scales well should be able to take advantage of multiple processors and have better performance than when only a single processor is available. If the application does not scale well, then the availability of additional processors does not necessarily improve performance. In fact, the availability of additional processors may actually degrade performance.

Currently, determining why an application does not scale well is often a very difficult problem. One aspect of understanding the scaling of applications is to determine what threads are waiting to execute and why they are waiting to execute. This type of data may help determine the flow between different threads, such as Java threads. A thread may wait for a requested operation or function to be completed. For example, a thread or routine may request data to be read from a storage device. This thread or routine is placed into a waiting mode until the operation to return data is completed. Waiting occurs for any type of input/output (I/O) in these examples.

Currently, this type of information is obtained by generating notifications or calls for all wait and notification mechanisms used in a particular environment. This type of notification also is considered too invasive. Again, the code to make the callout, receive the callout, and make the determination of importance may include much more than the code that processes the event. This type of perturbation affects the value of profiling and analyzing applications.

SUMMARY OF THE INVENTION

The illustrative embodiments provide a computer implemented method, apparatus, and computer usable program code for collecting information about threads. A thread entering a wait state is detected. Information is selectively obtained about a set of threads in the wait state using a policy in response to the thread entering the wait state.

The policy may specify obtaining information about a thread of interest in the set of threads if a number of threads in the set of threads exceeds a threshold when the thread enters the wait state. The policy may specify obtaining information about the set of threads if the number of threads in the set of threads exceeds a threshold when the thread enters the wait state. The policy also may specify obtaining information about the set of threads if a processor is in an idle state when the thread enters the wait state.

Call stack information may be obtained about a thread of interest in the set of threads in the wait state using the policy. A reason may be obtained as to why the thread of interest in the set of threads is in the wait state using the policy. A reason also may be obtained as to why a thread of interest in the set of threads entered the wait state using the policy. The information about the set of threads may be analyzed to identify a pattern for a reason why threads are in the wait state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
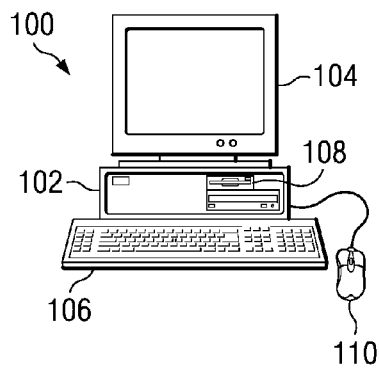
FIG. 1 is a pictorial representation of a network of data processing systems in which illustrative embodiments may be implemented.
Figure 2:
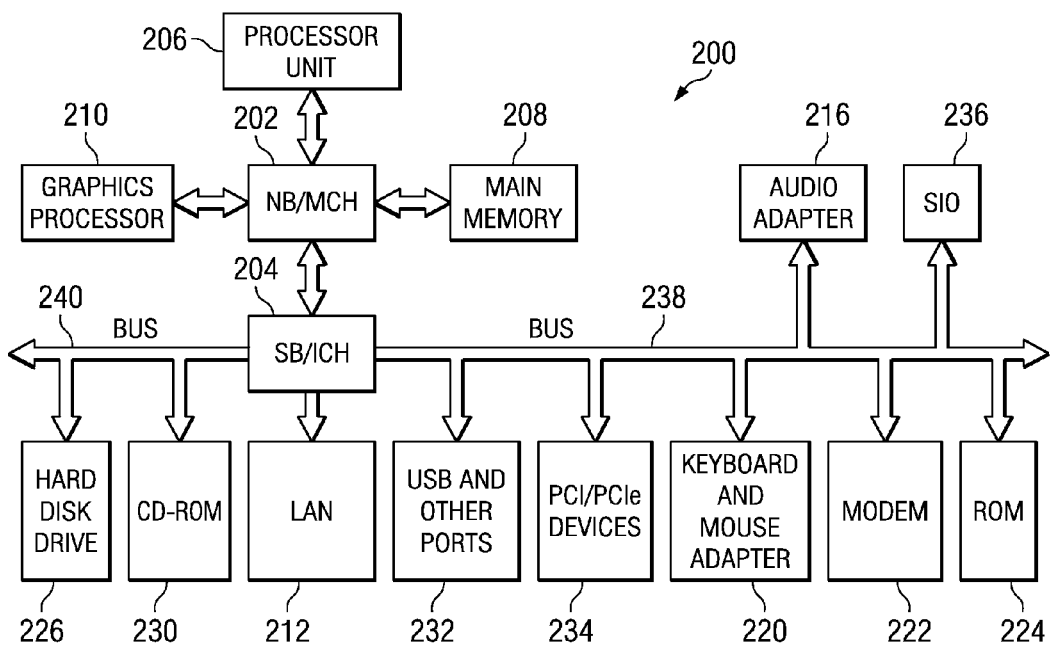
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
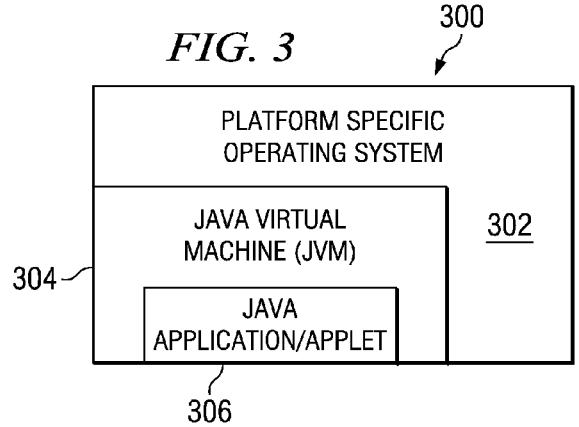
FIG. 3 is a block diagram illustrating the relationship of software components operating within a computer system that may implement the present invention.

With reference now to FIG. 3, a block diagram illustrating the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute a Java application or applet 306, which is a program, servlet, or software component written in the Java programming language. The computer system in which JVM 304 operates may be similar to data processing system 200 in FIG. 2 or computer 100 in FIG. 1 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs may not be run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes may be translated into native code by a just-in-time compiler or JIT.

A JVM loads class files and executes the bytecodes within them. The class files are loaded by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

The illustrative embodiments provide a computer implemented method, apparatus, and computer usable program code for collecting information on wait states occurring during execution of a program. In the illustrative embodiments, filter criteria are identified in which the criteria identified are associated with a wait state. A determination is made as to whether the filtering criteria are met when a set of requesters is in a wait state. This set of requesters may be one or more requesters, depending on the particular implementation. Information about a requester in this set of requesters is collected in response to determining that the filter criteria have been met.

In these examples, a wait state is a state in which a set of one or more requesters are waiting for some event to occur. This event may be, for example, waiting for ownership of a monitor to access a resource controlled or associated with a monitor. In these examples, the resource is a method that is accessed by the requester. The wait state also may occur, for example, when a set of one or more requesters is waiting for an operation to occur or complete. The operation in these examples is the completion of an input/output (I/O) request.

The different illustrative embodiments provide a computer implemented method, apparatus, and computer usable program code for collecting stack information when threads entering a wait state meet some policy. This policy may be, for example, a specified number of threads entering the wait state or some particular thread of interest entering a wait state. In the illustrative examples, a reason why a thread enters a wait state may be obtained. In these examples, this reason is identified through a reason code that may be obtained through the operating environment. This operating environment may be an operating system or a Java virtual machine. These reason codes may be used to identify a pattern as to why threads enter a wait state. This information may be analyzed and presented through the generation of reports.

Figure 4:
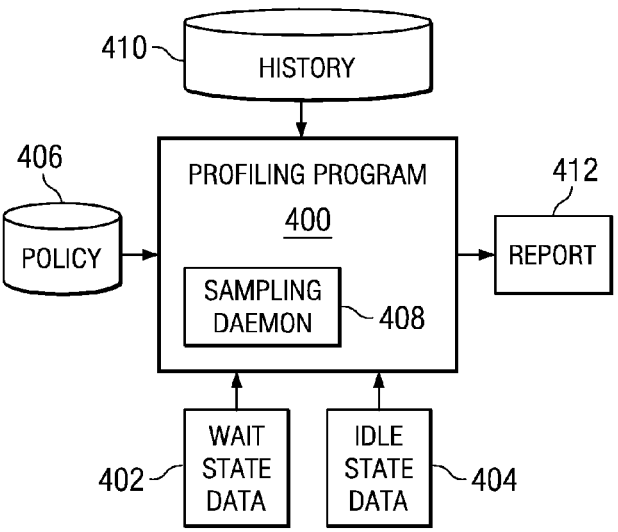
FIG. 4 is a diagram illustrating components used to collect information about the execution of threads in accordance with an illustrative embodiment.

With reference now to FIG. 4, a diagram illustrating components used to collect information about the execution of threads is depicted in accordance with an illustrative embodiment. Profiling program 400 may be used to collect data, such as wait state data 402 and idle state data 404. The collection of this information by profiling program 400 may be triggered based on threads entering a wait state that meets policy 406.

Policy 406 is a set of one or more rules that identify when information about a thread should be collected. For example, policy 406 may state that wait state data 402 should be collected when the number of threads entering a wait state exceeds a threshold level. Policy 406 also may contain a rule that causes the collection of wait state data 402 and idle state data 404 when a thread having a particular identifier enters a wait state. Yet another rule may specify that wait state data 402 is collected if any thread associated with a process having a particular identifier enters a wait state.

Policy 406 also may specify that wait state data 402 is gathered only when a processor enters an idle state in addition to threads entering an idle state. This determination as to whether a processor enters an idle state may be identified through idle state data 404. Further, idle state data 404 may provide information, such as a trace to be used to determine how long a thread in a wait state has been in the wait state. Further, idle state data 404 also may be used to determine when a thread entered the wait state and exited the wait state.

In these illustrative examples, profiling program 400 may gather wait state data 402 and idle state data 404 directly. Alternatively, profiling program 400 may generate sampling daemon 408 to gather this state data. History 410 contains wait state data and idle state data from prior periods of time. This data may be for a particular job or jobs that were previously run. Wait state data 402 and idle state data 404 collected by profiling program 400 may be compared to the data in history 410 to see if patterns can be found or if variances from patterns occur in analyzing why threads enter wait states.

Thereafter, profiling program 400 may generate report 412. Report 412 may take various forms, such as an arc flow report. Another example is a graph identifying threads and when particular threads are in a wait state during different periods of time.

Policy 406 may state that for a particular thread entering a wait state, data should be collected for that thread every five seconds.

Figure 5:
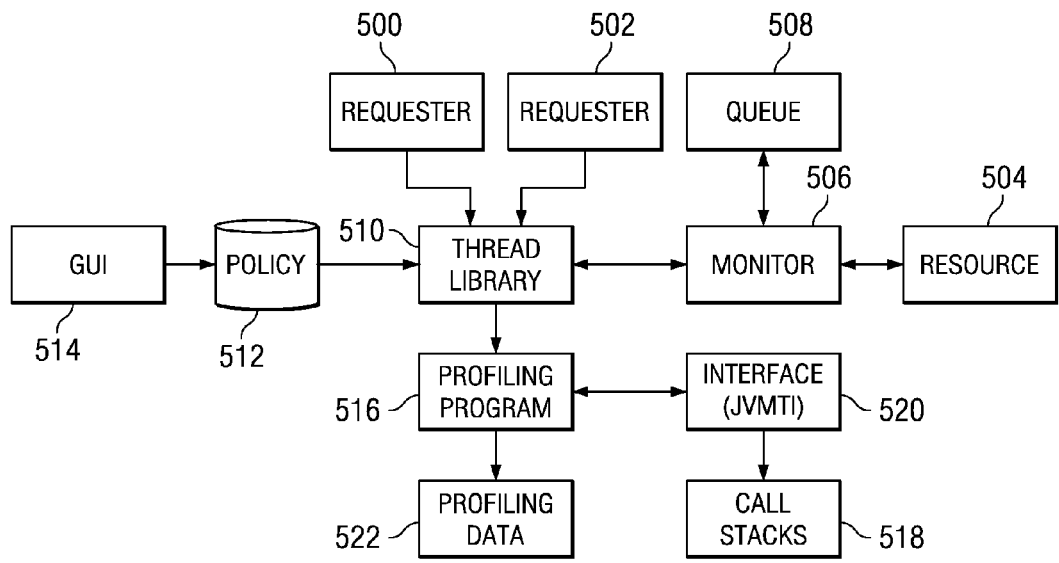
FIG. 5 is a diagram illustrating components used to collect information from a monitor in accordance with an illustrative embodiment.

Turning now to FIG. 5, a diagram illustrating components used to collect information from a monitor in accordance with an illustrative embodiment. In these examples, requesters 500 and 502 request access to resource 504. Resource 504 is associated with monitor 506. In this example, requesters 500 and 502 take the form of threads and resource 504 is a method accessed through monitor 506. Requests include any operation or service that is not being performed synchronously, such as, a database query or a credit card verification request. These services may be on the same machine or on a different machine. In a Java Virtual Machine (JVM), thread library 510 is the component that schedules the thread that is waiting on a service. In an operating system, the operating system itself, typically the scheduler, handles the dispatching of the threads that are waiting on a service.

Monitor 506 provides serial access to resource 504. In other words, monitor 506 only allows one requester to use resource 504 at a particular time. For example, if requester 500 requests access to resource 504, monitor 506 provides that access if no other requester is currently using resource 504. In this case, requester 500 is said to "own" monitor 506.

Thus, if requester 502 requests access to resource 504, monitor 506 does not allow access. Requester 502 is called a "contending" requester. In other words, monitor 506 locks resource 504 for use by requester 500.

When requester 500 releases resource 504, monitor 506 then allows requester 502 to take ownership of monitor 506 to access resource 504. Monitor 506 may maintain a list of requesters waiting to access resource 504 in queue 508. Selecting which requester should own a monitor from a group of contended requesters may be performed using any type of priority or selection scheme desired. For example, a first-in-first-out priority scheme may be employed.

In these examples, the requests are sent to monitor 506 through thread library 510. Thread library 510 is a component in a Java Virtual Machine that works with threads executing in the environment. This particular component provides functions, such as scheduling, locking infrastructure, placing threads in a wait state that wait for resources, and other functions involving threads.

The illustrative embodiments include processes in thread library 510 that are used to identify the presence of a wait state and filter criteria associated with the wait state. This filter criteria is used to determine whether a set of one or more requesters in a wait state meet the filter criteria. When these criteria are met, information about one or more of the requesters in the set of requesters is collected. In this particular example, an ability to identify specific monitors or locks for call outs or other actions is provided in thread library 510. Thread library 510 allows for monitors of interest to be selected for call outs or other actions.

The selection of monitors may be made through user input stored in policy 512. In these examples, policy 512 is a set of rules and data used to determine when to collect data when a wait state is present. In addition to identifying monitors of interest, policy 512 also includes filter criteria that are to be met before an action is taken. Policy 512 also may define what type of data is to be collected and from what requesters or processes associated with the wait states. In this example, requester 500 and requester 502 are associated with the wait state. Requester 500 owns monitor 506 and uses resource 504, while requester 502 is a contended requester waiting to obtain ownership of monitor 506.

These criteria may be defined through user input. These filter criteria may take various forms. For example, thresholds may be used to specify the minimum number of contended threads before taking action. Alternatively, the threshold may identify a maximum number contended requesters after which no further notifications are made. These contended threads are requesters waiting to access resource 504 in these examples. In this example, monitor 506 is the monitor selected for sampling of call outs.

Another example of filter criteria that may be specified includes selecting by thread name, thread group, or monitor identifiers. In this manner, if a particular thread, having a selected name that is stored in policy 512, is waiting for access to resource 504, an action such as a call out may be made. A call out is a call that is made to a program, such as profiling program 516. Additionally, if the thread having the selected name in policy 512 is using the particular resource, a call out also may be made. The specified criteria may include other occurrence thresholds, such as generating a call every ten times monitor 506 is requested.

The criteria contained within policy 512 may be selected or designated by a user through graphical user interface (GUI) 514 in these examples. Graphical user interface 514 also may provide a presentation of information relating to the code being executed to facilitate the selection of filter criteria.

For example, GUI 514 may present displays of threads that are being executed. From this display, a user may select one or more threads to form filter criteria as described above. As another alternative, GUI 514 may display monitors that are present for the execution of the code. From this display, the user may select one or more monitors as monitors of interest for which data is to be collected when different criteria are met.

Additionally, GUI 514 also may display actual code lines or modules or sections within the code being executed to allow the user to select portions of the code to form filter criteria. GUI 514 also may display areas of the code in which execution is occurring, as well as information as to how often particular portions of code are executed to allow the user to select portions of code for monitoring.

In these examples, when the filter criteria are met, an action is initiated or taken. More specifically, thread library 510 generates a call to profiling program 516. This call may identify the requester currently using resource 504 as well as the current requester or all requesters that are waiting to use resource 504. With this information, profiling program 516 may collect information, such as call stacks 518, using interface 520. A call stack is a list of frames in which the first frame is the top-most frame in the stack. In these examples, each frame typically contains the method (jmethodID) identification of the method entered and possibly the byte code, if being executed interpretively. Additional information may be available, such as, a program counter and a byte coded body method, a table associating variable names with values, a stack and a synchronization flag indicating whether the method currently executing is synchronized. A call stack identifying each method called for the waiting threads may be recorded in a tree in which the tree indicates the number of occurrences of this particular stack. This indication is made in these examples by incrementing a counter at the leaf node of the stack.

In these examples, interface 520 is a Java Virtual Machine Tools Interface (JVMTI). This interface allows for the collection of call stack information. Call stacks 518 may be, for example, standard trees containing count usage for different threads or methods. The Java virtual machine tool interface is an interface that is available in Java 2 software development kit (SDK), version 1.5.0. The Java virtual machine profiling interface (JVMPI) is available in Java 2 platform, standard edition (J2SE) SDK version 1.5.0. These two interfaces allow processes or threads to obtain information from the Java virtual machine in the form of a tool interface to the Java virtual machine. Either interface or any other interface to a Java virtual machine may be used to obtain call stack information for one or more threads. Further, these interfaces may be used to obtain reasons as to why the thread is in a wait state. In these examples, the reasons are returned as reason codes by interface 520.

Alternatively, call stacks 518 may be separate stacks and include timestamps that are useful for monitor analysis. Further, arcflow reports also may be generated on selected monitors and conditions in this sampling. Arcflow is a model for recording and reporting resource consumption for a broad range of performance data and analysis questions. The resources include, for example, interpreter cycles, heap objects allocated, heap byte allocated, JITed code instructions executed, and objects of different classes. These and other resources of interest may be used by consumers, such as for example, a thread, an object, an interpreted method, a system call, and a JITed method. Arcflow collects performance data, which may be, for example, sampled data, counter data, or some other type of data of interest. This collected data is stored in a trace file and reports are generated from the trace file. This model is used to capture the relationships between consumers and resources.

An arcflow report may include information identifying performance data, such as the number of occurrences or calls made and the resource consumption or processor time taken. This type of information is associated with the consumer or object requesting the particular resource. In these examples, the consumer is the method. Arcflow reports also may include other information, such as a percentage of the total consumption time rather than what is actually used by the particular consumer.

When this information is collected by profiling program 516, the information is stored as profiling data 522 for analysis. Profiling program 516 may generate arcflow reports for analysis. In particular, this analysis may yield results that allow a better understanding as to why a program does not scale well.

In these examples, the selected action is a call to profiling program 516. Of course, other actions may be taken depending on the particular implementation. For example, thread library 510 may directly retrieve call stacks 518 rather than calling profiling program 516. By collecting statistics, such as, the typical wait time for a specific service, thread library 510 may adjust its scheduling algorithm to check for rescheduling only after some minimum time has occurred. When the call out occurs, due to a notification, support is present for a reason code that identifies the cause of the notification. In these examples, reason codes are used. Reason codes could include, for example, timeout or disk I/O completed. This information allows for the collection of statistics to help with the identification of patterns. With this information, profiling program 516 may collect information, such as call stacks 518, using interface 520. For example, if the application is trying to monitor traffic patterns as a function of day/time to adjust traffic light changes where sensors detect specific conditions, collecting the posting reason data allows for better understanding of why there are flow problems. Further, the depth of a thread's call stack may be used as additional criteria for making the call out.

Profiling program 516 identifies where a program spends time during execution. This type of information may be used to discover how a program uses memory, what types of objects are used, and how many objects are used.

In these examples, the processes used to select monitors for sampling as well as the criteria needed to trigger the sampling are implemented within thread library 510. Of course, these processes could be implemented in other components in addition to or in place of thread library 510.

Another example of comparing filter criteria to a wait state involves requesters that have requested an operation, such as an I/O operation.

Figure 6:
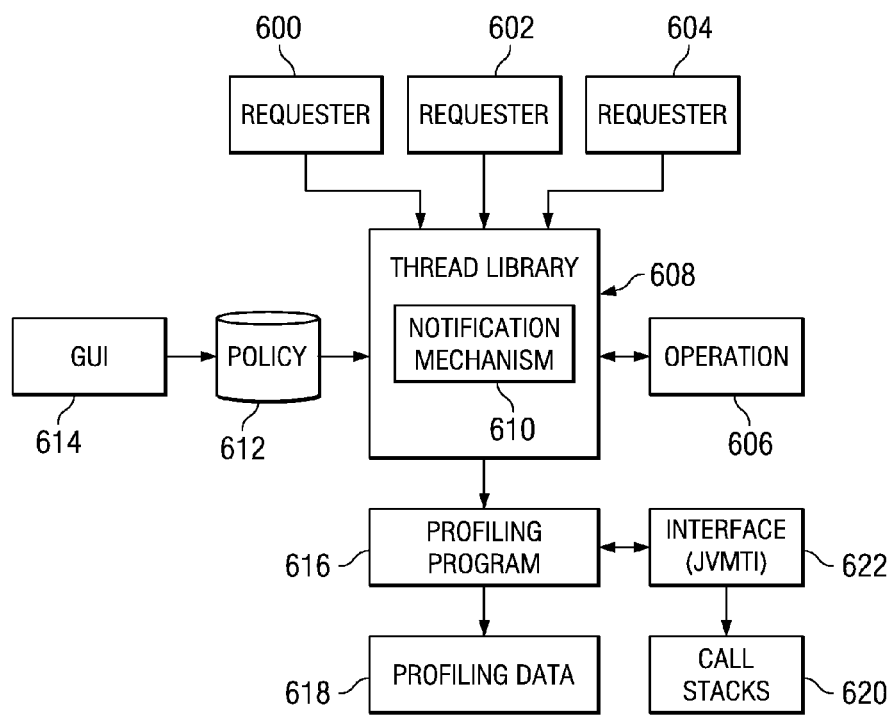
FIG. 6 is a diagram illustrating components in generating an action in response to criteria being met while one or more requesters are waiting for a notification in accordance with an illustrative embodiment.

Turning now to FIG. 6, a diagram illustrating components in generating an action in response to criteria being met while one or more requesters are waiting for a notification is depicted in accordance with an illustrative embodiment. In this example, one or more of requesters 600, 602, and 604 have requested operation 606 to be performed through thread library 608. In these examples, operation 606 is an I/O operation, such as a request to read data from disk.

Notification mechanism 610 in thread library 608 is used to notify requesters 600, 602, and 604 when operation 606 has completed. Although these examples show requesters 600, 602, and 604 requesting the same operation, the embodiments may be applied to different operations. Further, any operation may be used in the illustrative embodiments. Notification mechanism 610 notifies a requester, such as requester 600 that operation 606 has completed.

Notification mechanism 610, in these examples, includes a lock with a work area for waiting routines. The work area includes information on the status, owner, number of requests, a semaphore, and other information. Notification mechanism 610 monitors waiting requesters. In particular, notification mechanism 610 looks at a semaphore status to see if waiting requesters are present. A semaphore is a protected variable, or abstract data type, and constitutes the classic method for restricting access to shared resources, for example, storage, in a multiprogramming environment. An implementation of a semaphore allows for a mechanism to indicate a status of some activity and could take the form a shared space or variable to allow for inter-process communications. In these examples, the semaphore should be considered a shared memory area that includes or has a pointer to information regarding the criteria for making a callout or for performing an operation related to the semaphore.

Additionally, in these examples, notification mechanism 610 is a component in which the processes of the illustrative embodiments may be implemented. Of course, these processes may be implemented in other components in place or in addition to notification mechanism 610. In this particular example of an illustrative embodiment, notification mechanism 610 also determines when an action will be initiated for wait state for a set of one or more requesters waiting for an operation to complete. In these examples, notification mechanism 610 is a new mechanism that is used to notify or initiate an action.

In this embodiment, notification mechanism 610 uses policy 612 to initiate the action. Policy 612 contains the filter criteria used to determine when and what actions to take in these examples. Additionally, policy 612 may specify what operations are the ones for which information will be collected in addition to when or under what conditions information will be collected. The identification of the filter criteria is stored within policy 612 in these examples. In an illustrative embodiment, when a semaphore is initialized, a determination is made using policy 612 as to whether the semaphore is a selected semaphore for additional monitoring. If the semaphore is identified for additional monitoring, then an additional semaphore work area is allocated to contain the selection criteria. When the semaphore is owned or requested, a determination is made whether there are any additional criteria to be applied. In an alternative embodiment, a simple flag or pointer may be used to point to the specific policy related to the specific semaphore.

These filter criteria may include, for example, thresholds that specify the minimum number of waiting threads before activating notification mechanism 610 for contended requesters. Also, there may be specified a maximum number of contended requesters, which when met, indicate that no further processing takes place until the number of waiting threads is below the specified maximum. This maximum restriction is especially helpful, when there is a call out that identifies all the requesters. In another example, a call out is made when the number of requesters exceeds a previous maximum by a specified granularity. For example, a call out is made or an operation is performed when number of waiting threads is 10 or has increased by 10.

Additionally, policy 612 may include identification by thread name, thread group, or some other identifier as to when notification mechanism 610 is to be activated. In addition, time thresholds between start-wait-notify events generated by thread library 608, also may be used to determine when notification mechanism 610 is to be activated.

In these examples, GUI 614 may be used to present information to the user and allow the user to select filter criteria described above.

When the filter criteria stored in policy 612 are met, notification mechanism 610 performs a selected action, such as generating a call to profiling program 616. Profiling program 616 is an example of profiling program, such as profiling program 400 in FIG. 4. Other actions include, for example, collecting one or more call stacks to identify the calling sequence for the criteria for the sequence that has been met.

In these examples, profiling program 616 collects data and stores this data as profiling data 618 for later use. In this depicted example, thread library 608 generates a call out to profiling program 616 that includes the notifying thread and notified threads to allow profiling program 616 to collect information, such as call stacks 620 through interface 622. In these illustrative embodiments, interface 622 is a Java Virtual Machine Profiling Interface (JVMPI) or a Java Virtual Machine Tools Interface (JVMTI). Call stacks 620 may take the form of standard trees with count usage or may be separate stacks that include timestamps for monitor analysis.

Additionally, when a call out is generated, a reason code may be added to identify the cause of the notification. The reason code would be generated by the threading component, using policy 612. Thread library 608 would typically determine if the operation did not occur in a specified time. This determination is usually performed by specifying a timeout on the semaphore request. The call out to the profiler would typically be performed by a separate component such as the JVMTI component.

Alternatively, another component, including a native operating system, may have generated the reason code. Thread library 608 would need to pass on or translate the reason code generated by the component that detected the condition. These reason codes may include, for example, a timeout has occurred, disk I/O has been completed, or a disk write has completed. Whether a monitor is one selected for monitoring is determined using a policy, such as policy 612. This type of information may be used with the collection of statistics to identify patterns of operations. For example, if an application monitoring for traffic patterns as a function of day/time may adjust traffic light changes or sensors to detect specific conditions. The collection of reason codes may allow for a better understanding of why flow problems may occur for this system.

These illustrative embodiments provide a computer implemented method, apparatus, and computer usable program product for collecting data on idle states occurring during execution of code in a data processing system. In these examples, the aspects of the present invention analyze the transition and process states and collect idle counts during the execution of the code to form collected idle counts. This collecting of idle counts includes collecting information for a system having a transition between an idle state and a non-idle state. This system information may be information about a thread. The aspects of the present invention identify on a per-processor and per-thread basis the number of idle states intervals occurring for individual processors and all processors.

Additionally, the per-thread information identifies a number of dispatches from running to idle state and from idle state to running. Additionally, the total number of dispatches for the current processor and total number of idle dispatches for all processors are identified. Different embodiments allow for the association of idle information with entry/exit trees used to track execution of threads. On any entry or exit event, idle information may be applied to a node in these examples. Additionally, when nodes in a tree are constructed, a unique node address is added for each node to allow correlation of the context with the trace records. Alternatively, any unique node identifier may be used to provide a correlation between nodes and trace records. This unique node address is also written to a shared thread work area as entries and exits are processed. This node address may also be written into a trace record by a device driver. In this manner, reports may be generated for various idle related events.

Figure 7:
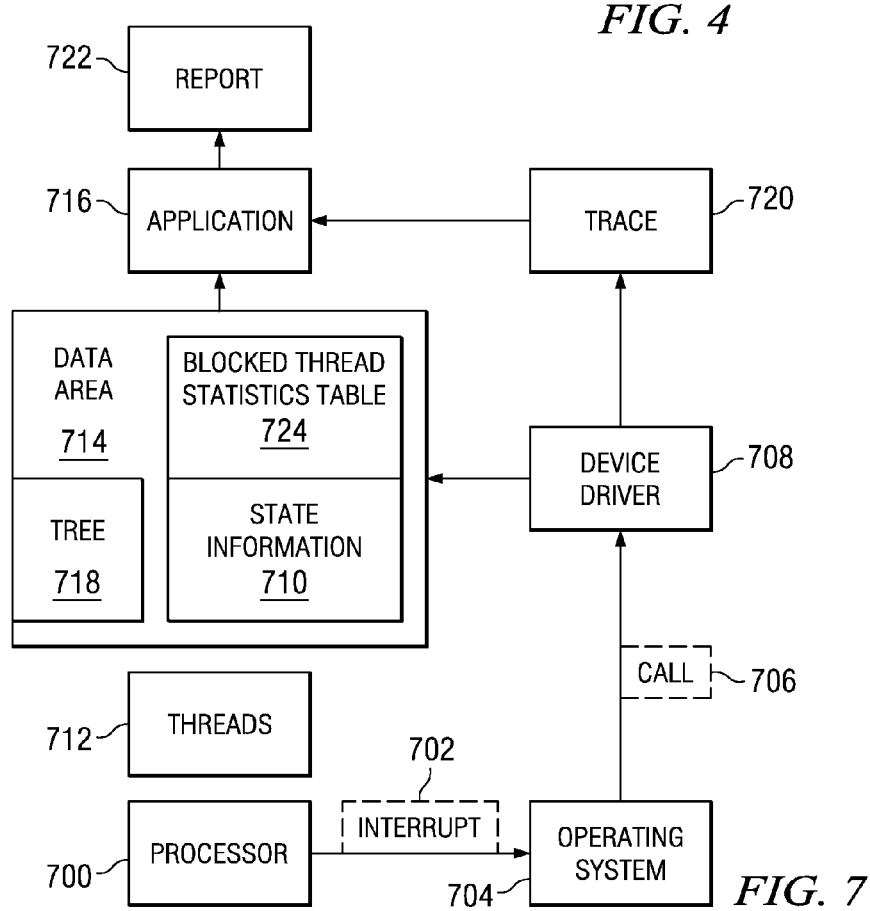
FIG. 7 is a diagram illustrating components used to identify idle states during processing in accordance with an illustrative embodiment.

Turning now to FIG. 7, a diagram illustrating components used to identify idle states during processing is depicted in accordance with an illustrative embodiment. In this depicted example, the components are examples of hardware and software components found in a data processing system, such as data processing system 200 in FIG. 2.

Processor 700 generates interrupt 702 and operating system 704 generates call 706. Call 706 is identified and processed by device driver 708. In these examples, the call is generated by a presently used operating system dispatcher located in operating system 704. This dispatcher is hooked or modified to generate a call or a branch to device driver 708 when an event of interest occurs. When call 706 is received from operating system 704, device driver 708 determines whether the dispatch is directed towards an idle processor thread or to a processor thread that is not idle in threads 712. Device driver 708 updates state information for processor 700, and performs operations such as accumulating counts and writing records in to trace 720. Device driver 708 saves state information 710 in data area 714 and returns control back to the dispatch routine within operating system 704.

Device driver 708 receives call 706 through hooks in these examples. A hook is a break point or callout that is used to call or transfer control to a routine or function for additional processing, such as determining idleness occurring during execution in these examples.

In these illustrative examples, device driver 708 increments counters for processors in which idle states occur to indicate the number of times a processor is idle during execution in state information 710. Device driver 708 writes counts or state information 710, which is accessible by application 716. Device driver 708 writes or increments a counter each time the idle thread is dispatched (at either the entry from the dispatch to the idle thread or the exit from the idle thread to the dispatch) and copies or accumulates this information for a thread into an area 710 accessible by the thread. At each entry or exit, application 716 records the current count for the number of idle states and compares this to a last count for the number of idle states for a particular thread. The difference between the two counts is accumulated into the current node in tree 718.

Further, in these illustrative examples, device driver 708 may include reason codes within state information 710. These reason codes may be received from the operating environment, such as operating system 704. Some operating systems provide reason codes to identify why threads are not executing. Device driver 708 receives this information from operating system 704 within call 706 in these examples. Depending on the implementation, operating system 704 may provide the reason code information directly to the called routine about the thread or threads involved in the dispatch. In these examples, the called routine is device driver 708. In other implementations, the called routine could be a profiling program. Operating system 704 may pass a reason code for either the thread that was dispatched from, the thread that was dispatched to, or both. Alternatively, operating system 704 may provide interfaces for device driver 708 to query the state of a thread or threads.

In these illustrative examples, the state information includes a count of the number of times that the operating system has dispatched to or from the idle thread. The counts are made on a per-processor basis. Additionally, an overall count for all the processors also may be maintained. These counts are maintained by device driver 708 in these examples. This information may be collected by application 716 to generate report 722 regarding idle states of processor 700. Application 716 may access data area 714 to process information and record information in tree 718.

Application 716 is an application that is event based, for example, the application receives a call out on any entry or exit to a routine. For Java, it may use the Java Virtual Machine Profiling Interface (JVMPI) requesting entry/exit notification. For C programs, it may request hooking by the compiler at function entry and exits. In this application any reference to method may also be applicable to a function. Tree 718 is constructed as entries and exits are processed. The aspects of the present invention store the number of idle states that have occurred in nodes within tree 718.

A count of the number of times that the thread for a processor has gone into an idle state is accumulated in a current node. The current node is the node for the method that has been entered into in executing the thread. When a method is entered, the current idle count is identified. When the method is exited or another method is entered, the new idle count is identified. The difference between the base of current idle counts and the new idle count is accumulated into the current node in tree 718. When the node is created, a unique identifier is also placed in the node. When entries or exits are processed, the node identifier for the current node being processed may be written by the application to a shared work area that is also accessible by a device driver. This unique identifier may be associated with, or used to identify this node for correlation with other trace information in these illustrative examples.

In an alternative embodiment, each time a dispatch occurs in which a thread with a unique identifier is dispatched with a change from its idle count, device driver 708 also generates a trace record for placement into trace 720. This particular trace record contains an identification of the current node address at the time of the interrupt. This node address is the unique identifier in these examples. This current node address is placed into trace 720 along with idle counts.

As a result, application 716 may access nodes within tree 718 and trace 720 to generate report 722. The combination of the information from trace 720 and tree 718 provide idle information needed to analyze and determine why processors become idle during execution of code. In these illustrative examples, report 722 contains information as to when processors are idle with respect to execution of threads 712. Additionally, data area 714 also includes blocked thread statistics table 724. Blocked thread statistics table 724 includes various information about threads that are in a wait state. These threads are ones that have been blocked from executing for one reason or another. Blocked thread statistics table 724 may include information, such as, for example, total runtime, number of timeslices since last sample, maximum timeslice value, and yield count from last sample. These statistics are stored in a data structure, such as a table in these examples.

In this illustrative example, only a single processor is illustrated. The aspects of the present invention may be applied to multi-processor systems in which two or more processors are present. In these types of systems, a counter may be assigned to each processor as well as a counter for the overall number of times that idle states have occurred in all of the processors within the data processing system.

Figure 8:
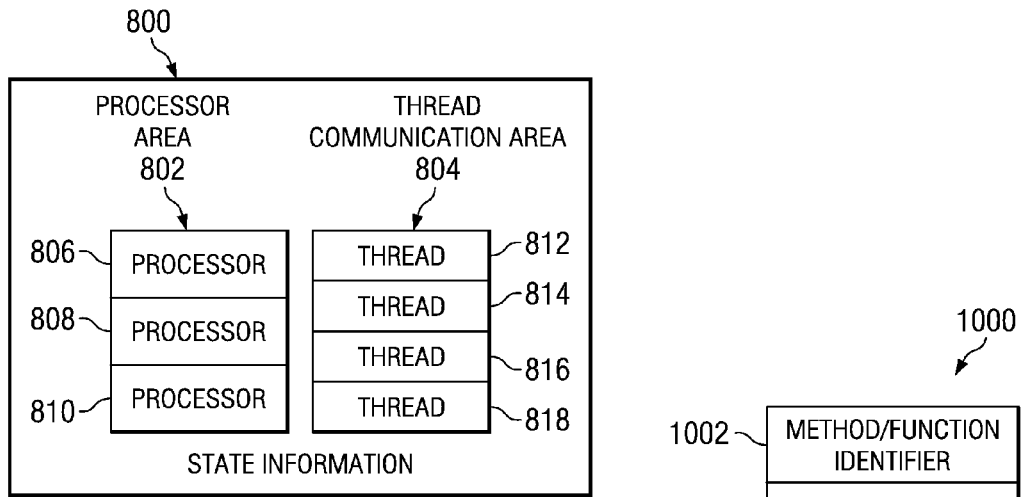
FIG. 8 is a diagram illustrating state information in accordance with an illustrative embodiment.

Turning to FIG. 8, a diagram illustrating state information is depicted in accordance with an illustrative embodiment. In this example, state information 800 is an example of state information 310 in FIG. 3. State information 800 contains processor area 802 and thread communication area 804.

In this example, process area 802 contains the number of idle dispatches for each processor. As depicted, process area 802 contains idle dispatch information for processors 806, 808, and 810. Thread communication area 804 contains information for individual threads. The information in thread communication area 804 may be accessed by the application and by the device driver. This area could be, for example, shared memory or specific requests to read or write to the area. In this example, thread communication area 804 contains state information for threads 812, 814, 816, and 818. Each of these sections in thread communication area 804 contains information that may include any or all of the following: an identification of the processor last dispatched, the number of idle dispatches on that processor at the time that the thread was last dispatched, the total number of idle dispatches on all processors at the time the thread was dispatched, the total number of dispatches while on any specific processor and an identification of the node, pNode. This identification may be the address of the node or any other unique identifier with the application's context. pNode may be written by the application as it processes entries and exits.

A call tree is constructed to identify all the functions or methods being called by any function or method. Each node in the call tree uniquely identifies a thread's call stack. For example in FIG. 9 described below, node C 906 identifies the call stack A->B->C. The call tree is constructed by monitoring method/functions entries and exits. This can be done in several different ways, in "C" programs most modern compilers provide a "function begin" and "function end" label that can be utilized by an application program. This feature is usually provided by the compiler as a compiler option flag. In dynamic programs, such as Java, the architecture usually provides the ability to "hook" into code execution Java virtual machine profiler interface (JVMPI) or its replacement the Java virtual machine tools interface (JVMTI), sending an event on method entry and exit to monitor code. Using either of these methods, as well as others, it is possible to create the program's call tree as code execution is processed. For more information about constructing call trees and applying base time or metric such as idle counts, refer to IBM Systems Journal, Vol. 39, Nov. 1, 2000, pgs. 118-134, "A unifying approach to performance analysis in the Java environment."

This call tree can be stored in trace 720 in FIG. 7, or as a separate file that can be merged in by application 716 in FIG. 7. Application 716 in FIG. 7 can use this call tree to provide the application's path as it goes into an idle state.

Figure 9:
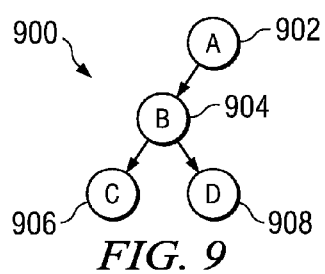
FIG. 9 is a diagram of a cell tree in accordance with an illustrative embodiment.

Turning to FIG. 9, a diagram of a tree is depicted in accordance with an illustrative embodiment. Tree 900 is an example of tree 718 in FIG. 7. Tree 900 is accessed and modified by an application, such as application 716 in FIG. 7. In this example, tree 900 contains nodes 902, 904, 906, and 908. Node 902 represents an entry into method A, node 904 represents an entry into method B, and nodes 906 and 908 represent entries into method C and D respectively. These nodes are created during entries and exits into various methods by threads. In the illustrative examples, each of these nodes is associated with a unique node identifier, which is then written into a trace, such as trace 720 in FIG. 7. The unique node identifier in these examples is the address of the node in memory. The information in these nodes also allow for retrieval of call stack information. The tree's node identifies the path to the node. For example, node 908 is labeled "D". This node's call stack is A->B->D.

Figure 10:
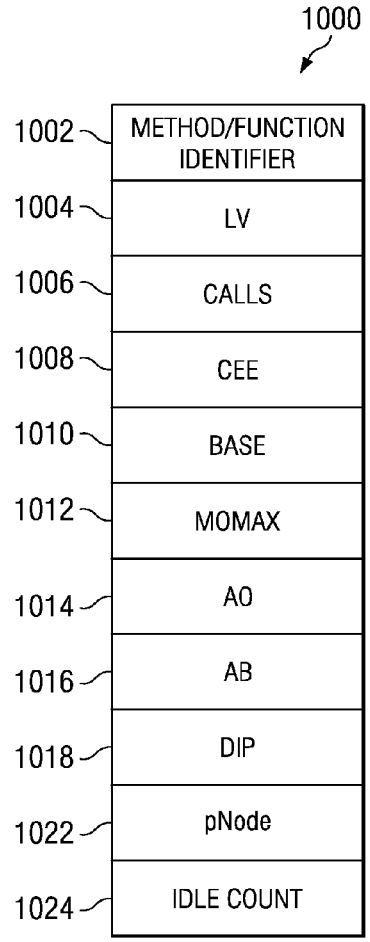
FIG. 10 is a diagram illustrating information in a node in accordance with an illustrative embodiment.

Turning now to FIG. 10, a diagram illustrating information in a node is depicted in accordance with an illustrative embodiment. Entry 1000 is an example of information in a node, such as node 902 in FIG. 9. In this example, entry 1000 contains method/function identifier 1002, tree level (LV) 1004, calls 1006, callees (CEE) 1008, base 1010, maximum amount of BASE time for any one event (M0MAX) 1012, allocated objects (AO) 1014, allocated bytes (AB) 1016, Dispatches to idle (DIP) 1018, Idle counts for all processors 1024, and node identifier (pNode) 1022.

Entry 1000 also contains idle counts for all processors 1024 and idle counts on a processor 1018. The information within entry 1000 is information that may be generated for a node within a tree. For example, method/function identifier 1002 contains the name of the method or function. Tree level (LV) 1004 identifies the tree level of the particular node within the tree. For example, with reference back to FIG. 9, if entry 1000 is for node 902 in FIG. 9, tree level 1004 would indicate that this node is a root node.

Calls 1006 indicates the number of calls made to the particular method. Base 1010 identifies the accumulated time on the method. The accumulated time is often stored in terms of numbers of instructions or cycles. Maximum time (M0MAX) for any one event 1012 identifies the maximum time that occurs for a particular event. Allocated objects (AO) 1014 identifies the number of objects allocated to the method and allocated bytes (AB) 1016 identifies the number of bytes allocated by the method. A unique identifier for the node, in this case the address or pointer to node identifier 1022 may be written in the Node at the time the node is created. In addition, node identifier 1022 may be provided to the device driver in a preferred embodiment by writing the currently active pNode at entries and exits to a data area shared between the device driver and the application.

In addition, the illustrative embodiments include other information used to determine why a particular processor is idle during certain periods of time when executing code. For example, node identifier 1022 is employed such that trace records may be merged with information in the different nodes of a tree. This node identifier is an address of the node within memory in these examples. Idle count 1024 identifies the total number of times that any processor was idle while the method was executing. Dispatches to idle (DIP) 1018 consists of the number of dispatches to idle on the same processor as the method was last running. Other counts and approaches could be used, for example, count only dispatches from the thread to idle, or count only dispatches from idle to the thread.

Figure 11:
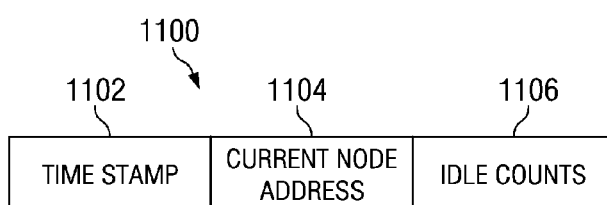
FIG. 11 is a diagram illustrating a trace record in accordance with an illustrative embodiment.

Turning to FIG. 11, a diagram illustrating a trace record is depicted in accordance with an illustrative embodiment. In this example, trace record 1100 is an example of a trace record within trace 720 in FIG. 7. Trace record 1100 contains time stamp 1102, current node address 1104, and idle counts 1106. Trace record 1100 is generated when there is a dispatch to or a dispatch from a thread that contains a pNode and there is also a change of idle counts from those in the thread work area and those maintained by the device driver. This record may be correlated to a call tree, such as tree 900 in FIG. 9. The correlation of this information with information within a tree showing entries into and exits from methods provides an ability to recover both the thread and the complete call stacks with the address of the current tree node found in current node address 1104.

Time stamp 1102 indicated when the particular event occurred. Additionally, idle counts 1106 indicates changes or count relating to dispatches to or from idle for the processor on which the thread had last been dispatched or the total number of idle counts for all processors or the number of dispatches to idle from the thread or the number of dispatches from idle to the thread. The information may be compressed by providing indications of what has changed and including only the change information. Current node address 1104 corresponds to the information stored in node identifier 1022 in FIG. 10.

Figure 12:
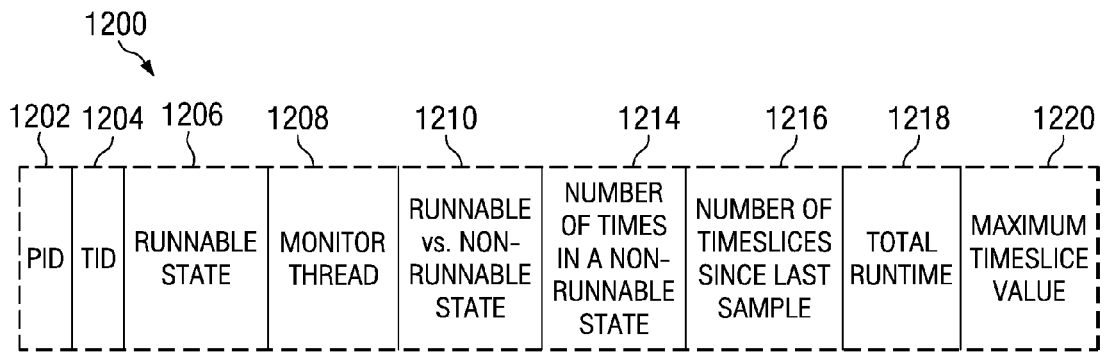
FIG. 12 is a diagram illustrating an entry in a table for maintaining statistics in accordance with an illustrative embodiment.

With reference now to FIG. 12, a diagram illustrating an entry in a table for maintaining statistics is depicted in accordance with an illustrative embodiment. Entry 1200 is an example of an entry in a table or data structure, such as information found in block thread statistics table 724 in FIG. 7. Entry 1200 is an example of information that may be written by a device driver, such as device driver 708 in FIG. 7.

In this example, entry 1200 includes process identifier (PID) 1202, thread identifier (TID) 1204, runnable state 1206, monitor thread 1208, runnable vs. non-runnable state 1210, number of times in a non-runnable state 1214, number of timeslices since last sample 1216, total runtime 1218, and maximum timeslice value 1220.

Process identifier (PID) 1200 identifies the process to which a particular thread is associated with. Thread identifier (TID) 1204 is used to identify a thread that has entered the wait state. Runnable versus non-runnable state 1210 is a field in which identifies the current state of the thread. A runnable state is a state in which a thread can execute but may be in a wait state because the timeslice has run out. A thread would not be in a runnable state if the thread is waiting on a lock or waiting for I/O to complete.

Number of times in a non-runnable state 1214 contains information identifying the number of times a thread has caused itself to enter a non-runnable state. Number of timeslice since last sample 1216 is a field in which the number of times a thread has been dispatched to execute may be stored.

Total runtime 1218 is the total time that the thread has executed since being created. Maximum timeslice value 1220 identifies the longest execution time within a timeslice that a thread executed before being dispatched out or the amount of time a thread executed before a timeslice for the thread expired.

Of course, other information also may be stored within entry 1200 depending on the particular implementation. The different information, in these examples, identifies different statistics that may be of interest and is used to determine why a thread was in a wait state. For example, other information that could be kept in entry 1200 for the table might include identifying the amount of time the thread is in a runnable state versus the amount of time the thread is in a non-runnable state. This information could be reflected as a percentage. Also, if the device driver causes the sampling thread to be woken to collect sample data, then the information may include information reflecting changes that have taken place from the last sample.

Figure 13:
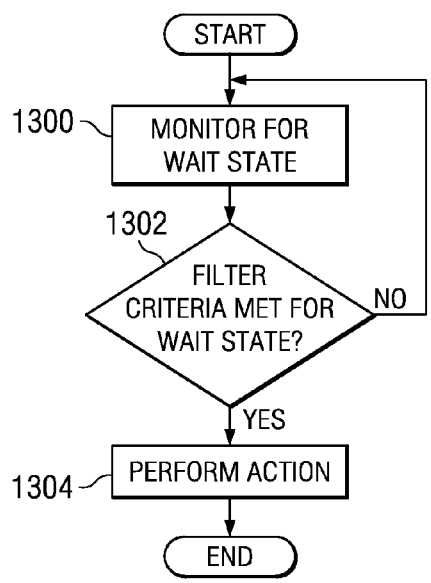
FIG. 13 is a flowchart of a process for monitoring for a wait state in accordance with an illustrative embodiment.

Turning now to FIG. 13, a flowchart of a process for monitoring for a wait state is depicted in accordance with an illustrative embodiment. In this particular example, the wait state is one that occurs when waiting for access to the resource or waiting for an operation to complete. The process illustrated in FIG. 13 may be implemented in a component, such as thread library 510 in FIG. 5.

The process begins by monitoring for a wait state (step 1300). In this example, the wait state may be any state in which a set of one or more requesters are waiting. For example, the requesters may be waiting for access to the resource through a monitor or for an operation to complete. A determination is made as to whether the filter criteria are met for the wait state (step 1302). This filter criteria may simply be a determination that known selection criteria is specified and no further action is required. One illustrative implementation uses a flag or pointer in the semaphore itself to indicate if any criteria are present to check. If the filter criteria are met in step 1302, the process performs an action (step 1304) with the process terminating thereafter. If the process determines the criteria were not met or no criteria specified in step 1302, the process returns to step 1300 to monitor for a wait state.

Figure 14:
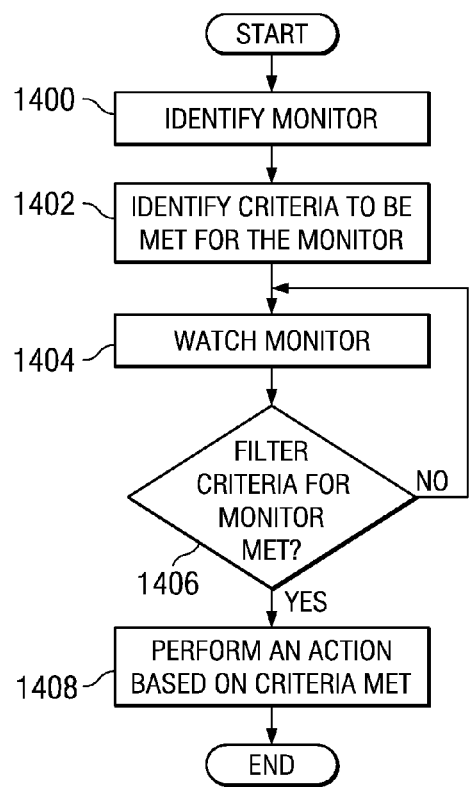
FIG. 14 is a flowchart of a process for generating an action in response to filter criteria being met for a wait state in accordance with an illustrative embodiment.

Turning now to FIG. 14, a flowchart of a process for generating an action in response to filter criteria being met for a wait state is depicted in accordance with an illustrative embodiment. The process illustrated in FIG. 14 may be implemented in a component such as thread library 510 in FIG. 5.

The process begins by identifying a monitor (step 1400). Whether a monitor is one selected for monitoring is determined using a policy, such as policy 512 in FIG. 5. Then the process identifies filter criteria to be met for the monitor (step 1402) and watches the monitor (step 1404). In this example, the filter criteria are obtained by the thread library from a policy, such as policy 512 in FIG. 5. A determination is made as to whether the filter criteria are met for the wait state (step 1406). In step 1406, the wait state occurs with the presence of one or more requesters waiting for access to the monitor. If the filter criteria are met in step 1406, the process performs an action based on the criteria met (step 1408) with the process terminating thereafter.

In this particular example, the action is one such as a call to a profiling program when certain criteria are met with respect to a monitor of interest. If the process determines the filter criteria were not met in step 1406, the process returns to step 1404 to watch the monitor.

Figure 15:
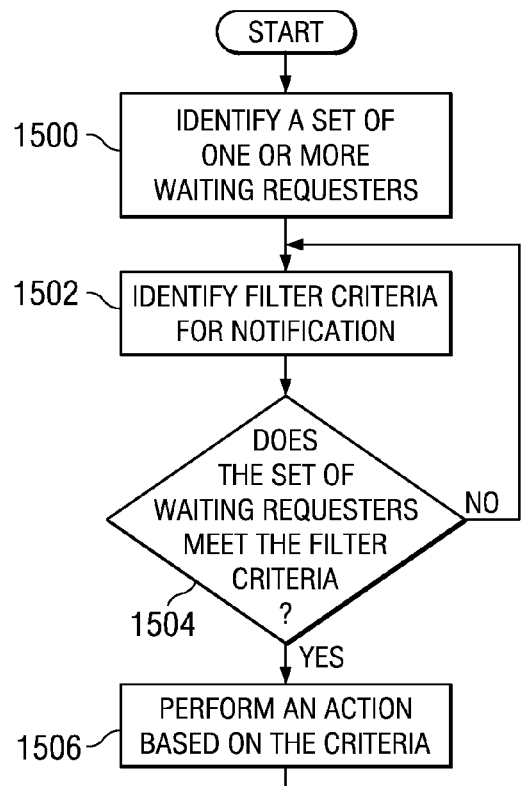
FIG. 15 is a flowchart of a process for initiating an action when filter criteria are met during a wait state in accordance with an illustrative embodiment.

Turning now to FIG. 15, a flowchart of a process for initiating an action when filter criteria are met during a wait state is depicted in accordance with an illustrative embodiment. The process illustrated in FIG. 15 may be implemented in a component such as thread library 608 in FIG. 6.

The process begins by identifying a set of one or more waiting requesters (step 1500). The requesters are processes or routines that have requested an input/output (I/O) operation in these examples. The requesters wait until the I/O operation has completed. These requesters are notified by a notification mechanism, such as notification mechanism 610 in FIG. 6, when the operation has completed.

Then the process identifies filter criteria for notification (step 1502). These filter criteria may be, for example, 10 requesters are present or a timeout period has passed. The process then determines if the set of waiting requesters meet the filter criteria (step 1504). If the waiting resources meet the filter criteria in step 1504, the process performs an action based on those criteria (step 1506) with the process terminating thereafter.

Turning back to the determination made in step 1504, if the waiting resources do not meet the filter criteria, the process returns to step 1502 and continues to identify filter criteria for notification.

Figure 16:
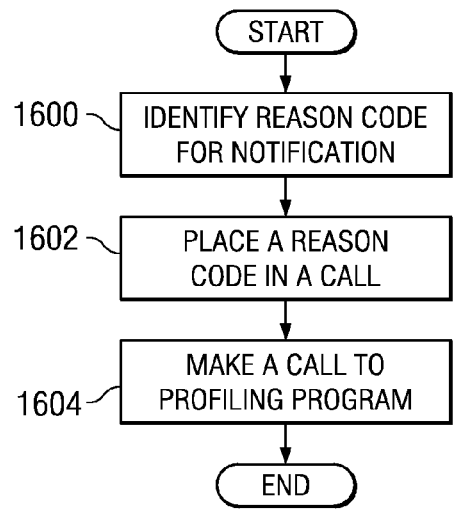
FIG. 16 is a flowchart of a process for generating a call out with a reason code in accordance with an illustrative embodiment.

Next, FIG. 16 is a flowchart of a process for generating a call out with a reason code in accordance with an illustrative embodiment. The process in FIG. 16 is a more detailed description of step 1506 in FIG. 15.

The process begins by identifying a reason code for notification (step 1600). In the illustrative embodiments, the reason code takes a form or format that is usable by the program that is called. The process then places the reason code in a call (step 1602). Finally, a call is made to a profiling program (step 1604), with the process terminating thereafter.

The illustrative embodiments provide a computer implemented method, apparatus, and computer usable program code for collecting information relating to requesters in a wait state. Filter criteria associated with a wait state are identified. A determination is made as to whether the wait state is met when a set of requesters is in the wait state. In response to the filter criteria being met, information about one or more requesters is collected. This information may be used to identify reasons as to why the different wait states are occurring.

Figure 17:
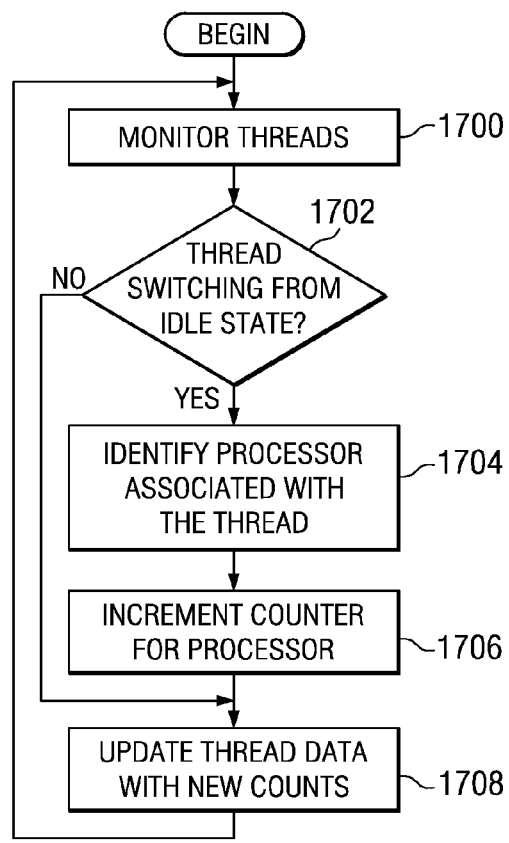
FIG. 17 is a flowchart of a processor for incrementing counters for threads in an idle state in accordance with an illustrative embodiment.

Turning to FIG. 17, a flowchart of a processor for incrementing counters for threads in an idle state is depicted in accordance with an illustrative embodiment. The process illustrated in FIG. 17 may be implemented in a device driver, such as device driver 708 in FIG. 7.

The process begins by monitoring threads (step 1700). A determination is made as to whether a thread is switching from an idle state (step 1702). This determination may be made by a device driver in response to dispatches occurring during execution of code by a processor. If the thread is switching from an idle state, the processor associated with the thread is identified (step 1704). The process then increments the counter for the identified processor (step 1706). The process then proceeds to update the thread data area with idle counts (step 1708). These idle counts may include the specific processor idle counts or idle counts for all processors or any other idle count as described in this application. Then, the process proceeds to step 1700 as described above. Step 1708 is described in more detail in the description of FIG. 11 below.

With reference again to step 1702, if the thread is not switching from an idle state, the process proceeds to step 1708 as described above.

Figure 18:
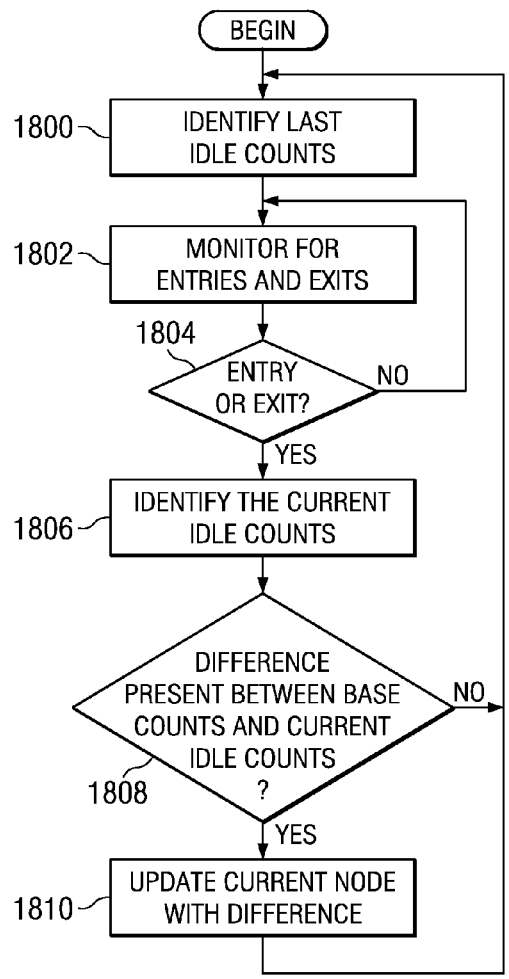
FIG. 18 is a flowchart of a process for monitoring an active thread in accordance with an illustrative embodiment.

Turning now to FIG. 18, a flowchart of a process for monitoring an active thread is depicted in accordance with an illustrative embodiment. The process illustrated in FIG. 18 may be implemented in an application, such as application 716 in FIG. 7. The application monitors a thread that is active using this process to update counts in a node when a thread enters or exits a method.

The process begins by identifying last idle counts (step 1800) which could be kept in its thread node. Thereafter, the process monitors the thread for entries and exits into methods (step 1802). A determination is made as to whether an entry or exit has been detected (step 1804). If an entry or exit into a method is not detected, the process returns to step 1802 to continue to monitor the thread.

Otherwise, the process identifies the current idle count (step 1806). The current idle counts are identified from counters present in a work area, such as data area 714 in FIG. 7. These counts may be any of the counts being maintained in the thread work area by the device driver, for example it could be the dispatch to idle count for a particular processor on which the thread had been executing or it could be the counts of all dispatches to idle for all processors. A determination is made as to whether a difference is present between the base count and the current idle count (step 1808). If a difference is present, the process updates the current node with the difference between the two counts (step 1810) with the process then returning to step 1800. With reference again to step 1808, if a difference is not present, the process also returns to step 1800 without updating any of the nodes or it could add the difference of zero.

Figure 19:
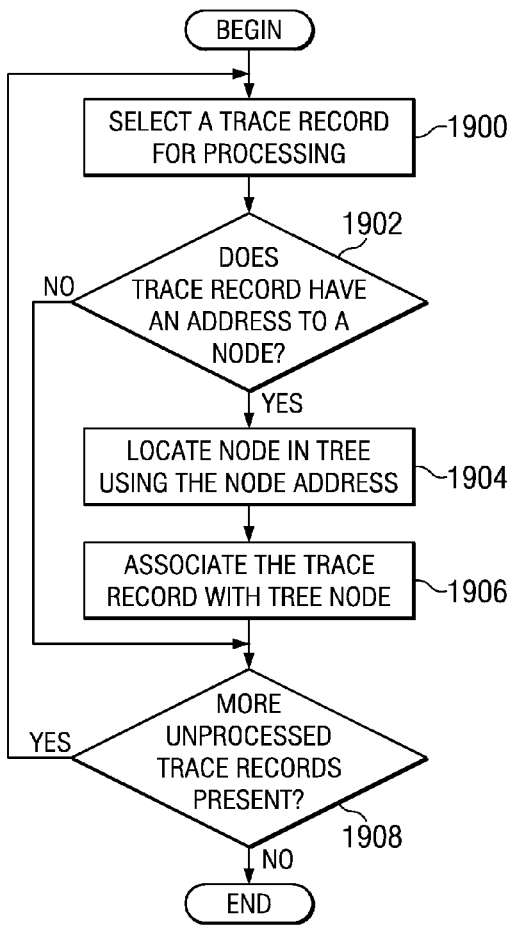
FIG. 19 is a flowchart of a process for combining trace records with nodes in a tree in accordance with an illustrative embodiment.

Turning now to FIG. 19, a flowchart of a process for combining trace records with nodes in a tree is depicted in accordance with an illustrative embodiment. The process illustrated in FIG. 19 may be implemented in an application, such as application 716 in FIG. 7. This process is used to combine trace records with trees. The correlating or associating of information in a tree may involve, for example, writing the information into the node or creating a new node depending on the particular implementation. The combining of trace records as described in FIG. 19 may occur on different data processing systems. For example, the data may be captured from an embedded device or remote data processing system. This information may be collected and combined at another data processing system for analysis.

The process begins by selecting a trace record for processing (step 1900). A determination is made as to whether the trace record has an address to a node (step 1902). If the trace record has an address to a node, the node is located in the tree using the node address (step 1904). The process then associates the trace record with the tree node (step 1906). Step 1906 may be implemented by placing the information from the trace record into the tree node. Alternatively, a new node may be created. Thereafter, a determination is made as to whether additional unprocessed trace records are present (step 1908). If additional unprocessed trace records are present, the process returns to step 1900. Otherwise, the process terminates.

With reference again to step 1902, if the trace record does not have an address to a node, the process proceeds to step 1908 as described above. In this manner, information may be combined from trace records identifying idle counts with a tree constructed by processing entries and exits. By correlating the idle count or event information with this tree, an analysis may be made as to why a processor is idle during certain points of execution.

Figure 20:
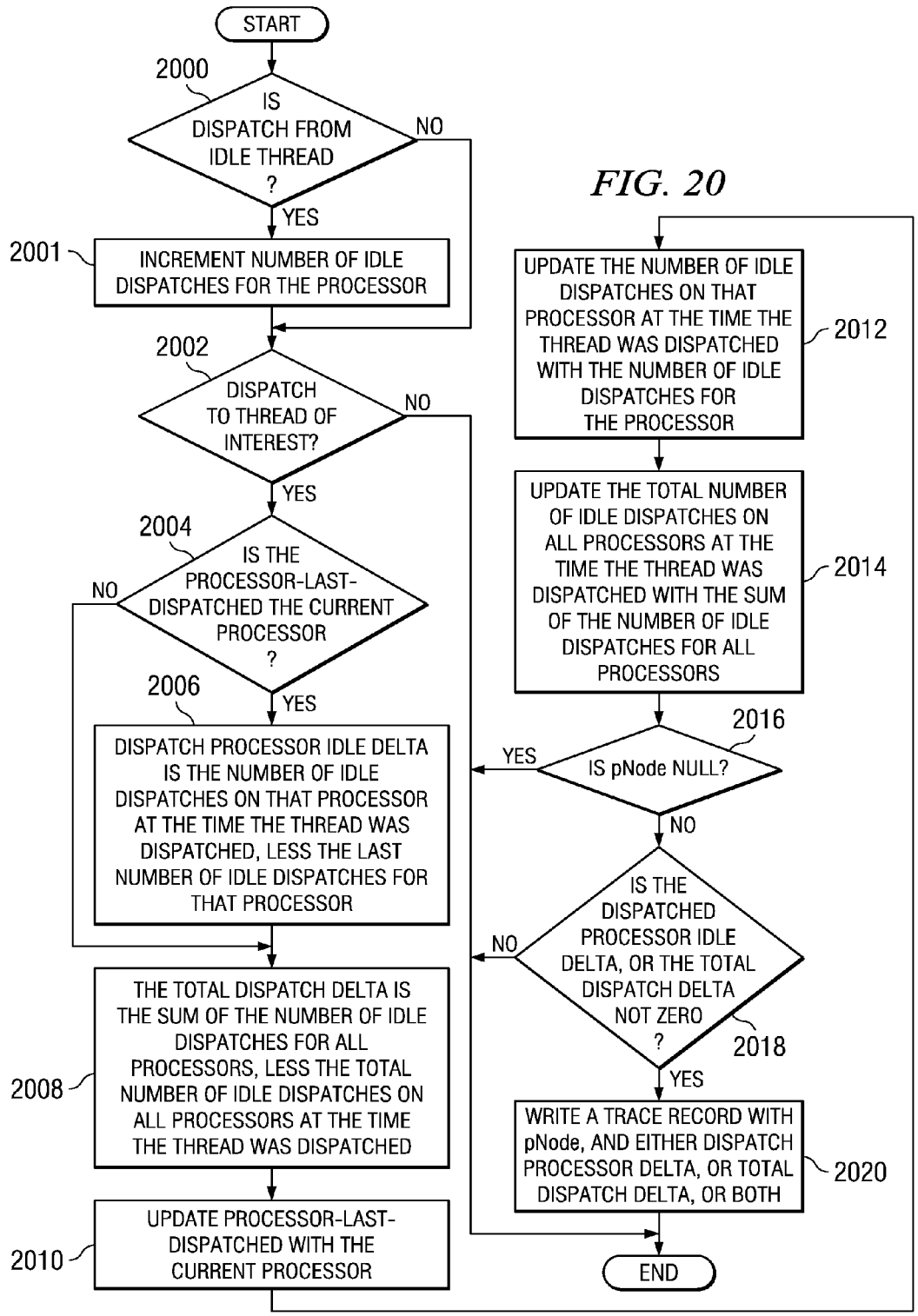
FIG. 20 is a flowchart of a process for handling dispatching from an idle thread in accordance with an illustrative embodiment.

With reference now to FIG. 20, a flowchart of a process for handling dispatching from an idle thread is depicted in accordance with an illustrative embodiment. The process illustrated in FIG. 20 may be implemented in a device driver, such as device driver 708 in FIG. 7. In particular, FIG. 20 is a more detailed description of step 1708 in FIG. 17. This figure describes a single dispatch in these examples.

The process begins when a thread is dispatched and a determination is made if the dispatch is from idle (step 2000) If the dispatch is from idle then the process continues by incrementing the number of idle dispatches for the processor (step 2001). In any case the process continues by making a determination as to whether the dispatch is to a thread of interest (step 2002). The thread of interest may be any thread or a particular thread that has been identified for monitoring. If the dispatch is not to a thread of interest in step 2000, the process terminates. Otherwise, a determination is made as to whether the thread of interest was last dispatched to the current processor (step 2004).

If the thread of interest was last dispatched to the current processor, the dispatch processor's idle delta is set equal to the new number of idle dispatches on that processor at the time the thread was dispatched minus the last number of idle dispatches for the processor (step 2006). The last processor dispatched and the last number of idle dispatches for the processor are available in the thread work area. The new number of idle dispatches on that processor are in the per processor work area.

The change of values are placed or accumulated in the thread work area. If the last processor dispatched is not the current processor as specified in the thread work area, then in a preferred embodiment, the difference between the current value of the number of idle dispatches on the previous processor available in the per processor work area and the previous number of idle dispatches on the thread available in the thread work area may be added to the total number of dispatches on processor in the thread work area.

In this embodiment, the total number of dispatches on the last dispatched processor is also kept in the thread work area. Then or later, the thread work area is updated with the new processor and the new number of dispatches for that processor in the thread work area (step 2012). Thereafter, the total dispatch delta is set equal to the sum of the number of idle dispatches for all processors minus the total number of idle dispatches on all processors at the time thread was dispatched (step 2008). In alternative embodiment, the process proceeds directly to this step from step 2004, if the processor last dispatched is not the current processor. Next, the process updates the processor last dispatched in the thread work area with the current processor (step 2019).

Then, the number of idle dispatches on the processor at the time the thread was dispatched is updated with the number of idle dispatches for the processor (step 2012). Next, the process updates the total number of idle dispatches on all processors at the time the thread was dispatched with the sum of the number of idle dispatches for all processors (step 2014). A determination is made as to whether the pNode is null (step 2016). The pNode is the address for a node on a tree used to trace entries into and exits from methods. This determination is made to see whether a node is present. If the pNode is null, the process terminates. Otherwise, a determination is made as to whether the dispatched idle delta or the total dispatched delta is not equal to zero (step 2018). If both are equal to zero, the process terminates. Otherwise, a trace record is written with the pNode and either the dispatch processor delta, total dispatch delta, or both values (step 2020) with the process terminating thereafter.

The illustrative embodiments provide a computer implemented method, apparatus, and computer usable program product for generating data for use in determining why a processor may be idle during execution of code. The different embodiments also allow for the occurrence of idle states in a processor to be correlated to other execution information, such as methods being entered or exited and call stack information. With this combined information, reports may be generated to analyze why a processor enters an idle state during execution and whether those idle states may be reduced by code optimization or changes.

Figure 21:
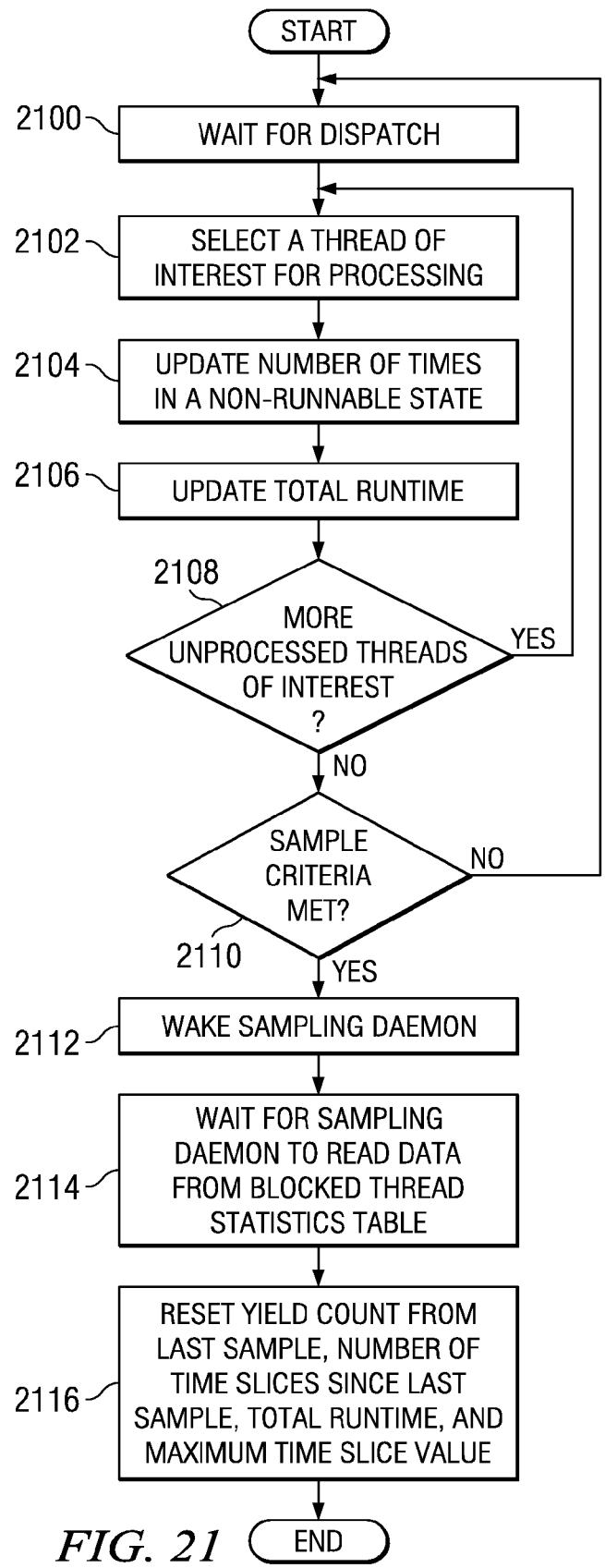
FIG. 21 is a flowchart of a process for collecting information about threads in accordance with an illustrative embodiment.

Turning next to FIG. 21, a flowchart of a process for collecting information about threads is depicted in accordance with an illustrative embodiment. The process illustrated in FIG. 21 may be implemented in a software component, such as device driver 708 in FIG. 7. This process is initiated by a device driver, in these examples, each time a dispatch of a thread occurs.

The process begins by waiting for a thread to be dispatched to idle (step 2100). A thread of interest is then selected for processing (step 2102). In these examples, a thread of interest may be identified by the device driver using an entry in a table, such as entry 1200 in FIG. 12. In particular, monitor thread 1208 in FIG. 12 is an example of a field where an indication may be made as to whether a thread is a thread of interest.

Depending on the policy, a single thread may be selected or multiple threads may be selected. As an example, all threads associated with a particular process may be threads of interest. The number of times in a non-runnable state for the thread is updated in a blocked thread statistics, such as in blocked thread statistics table 724 in FIG. 7. In particular, a field, such as number of times in a non-runnable state 1214 in entry 1200 may be updated with the information obtained in (step 2104). Thereafter, the total runtime is updated in the statistics thread (step 2106). This update may be made in total runtime 1218 in entry 1200 in FIG. 12.

Next, a determination is made as to whether additional unprocessed threads of interest are present (step 2108). If additional threads of interest are present, the process returns to step 2102 to select a thread of interest for processing.

If additional threads of interest are no longer present, a determination is made as to whether a sample criteria has been met (step 2110). The sample criteria is defined using a policy in these examples. This policy may be, for example, policy 406 in FIG. 4. The criteria in the policy may specify that when a certain number of threads have entered an idle state, data regarding threads of interest should be collected.

Alternatively, the criteria may state that if a particular thread of interest enters an idle state, information should be collected from the blocked statistics that have been gathered. If the sample criteria has not been met, the process returns to step 2100 to wait for another thread dispatch.

Otherwise, the process wakes the sampling daemon (step 2112). In these examples, this sampling daemon is a thread that is spawned or generated by a profiling program. The sampling daemon may be, for example, sampling daemon 408 in FIG. 4. The process then waits for the sampling daemon to read data from the blocked thread statistics table (step 2114). After the sampling daemon has read the data from the blocked thread statistics table, the process resets the yield count from the last sample, the number of timeslices since the last sample, the total runtime, and the maximum timeslice value (step 2116) with the process terminating thereafter.

Figure 22:
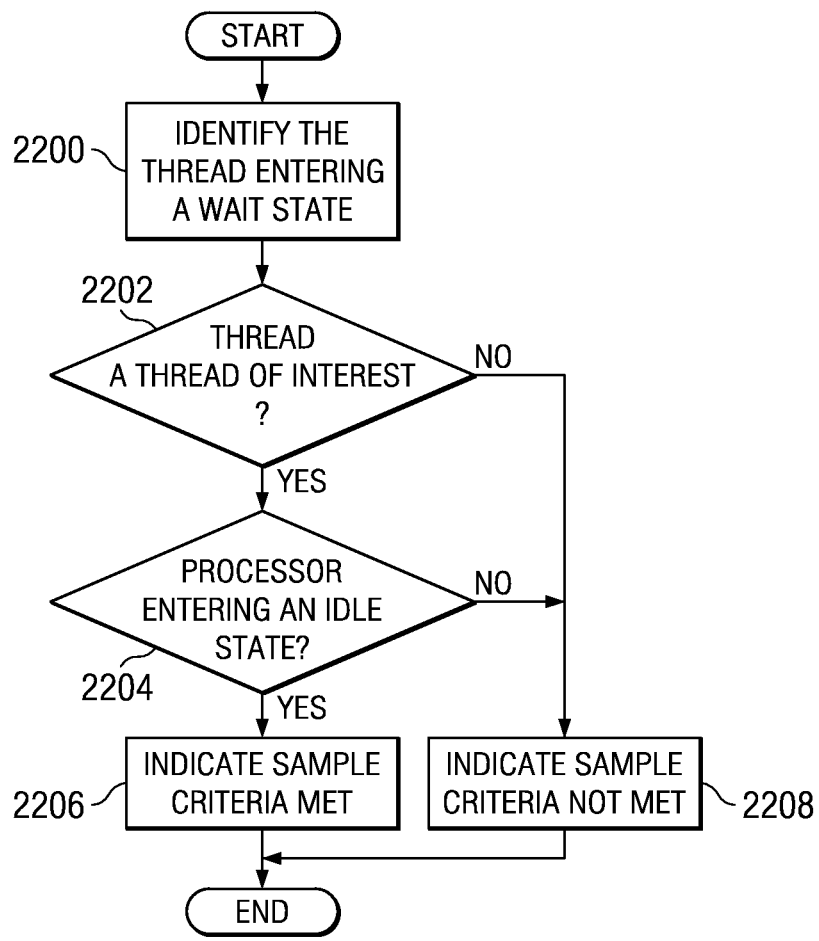
FIG. 22 is a flowchart of a process for determining whether sample criteria have been met in accordance with an illustrative embodiment.

Turning now to FIG. 22, a flowchart of a process for determining whether sample criteria has been met is depicted in accordance with an illustrative embodiment. The process illustrated in FIG. 22 is a more detailed example of step 2110 in FIG. 21. The criteria illustrated in this flowchart is an example of one set of criteria that may be implemented for determining whether sampling should occur.

The process begins by identifying a thread entering a wait state (step 2200). Thereafter, a determination is made as to whether the thread is a thread of interest (step 2202). If the thread is a thread of interest, a determination is made as to whether the processor has entered an idle state (step 2204). If a processor has entered an idle state, an indication is made that the sample criteria has been met (step 2206) with the process terminating thereafter.

With reference again to step 2204, if the processor is not entering an idle state, an indication is made that the sample criteria has not been met (step 2208) with the process terminating thereafter. With reference again to step 2202, if the thread is not a thread of interest, the process also proceeds to step 2208 as described above.

In this manner, the process illustrated in FIG. 22, sets out an implementation of one policy that may be used to determine when to sample information. Alternatively, step 2202 could be changed to make the determination as to whether the additional thread results in the number of threads in an idle state exceeding a threshold. Of course, the process in FIG. 22 will vary depending on the policy being implemented. As another example, in some cases, step 2204 may be omitted.

Figure 23:
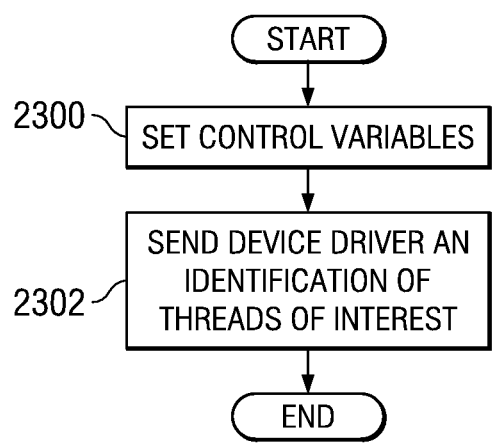
FIG. 23 is a flowchart illustrating initialization performed for collecting statistics in accordance with an illustrative embodiment.

Turning next to FIG. 23, a flowchart illustrating initialization performed for collecting statistics is depicted in accordance with an illustrative embodiment. The process illustrated in FIG. 23 may be implemented in a thread, such as sampling daemon 408 in FIG. 4.

The process begins by setting control variables (step 2300). These control variables are different variables for which data is desired. The control variables are for various metrics, such as, for example, time, count, and non-runnable count. The time identifies a sample interval. The variable count identifies a count of yields between samples that are used to trigger a dump or collection of data. The non-runnable count is an identification or number of threads that are non-runnable. The process sends a device driver an identification of the threads of interest (step 2302) with the process terminating thereafter. These threads of interest, in these examples, are identified using a policy, such as policy 406 in FIG. 4. The threads of interest are sent to the device driver so that the device driver will know when to collect data for different threads that execute.

Figure 24:
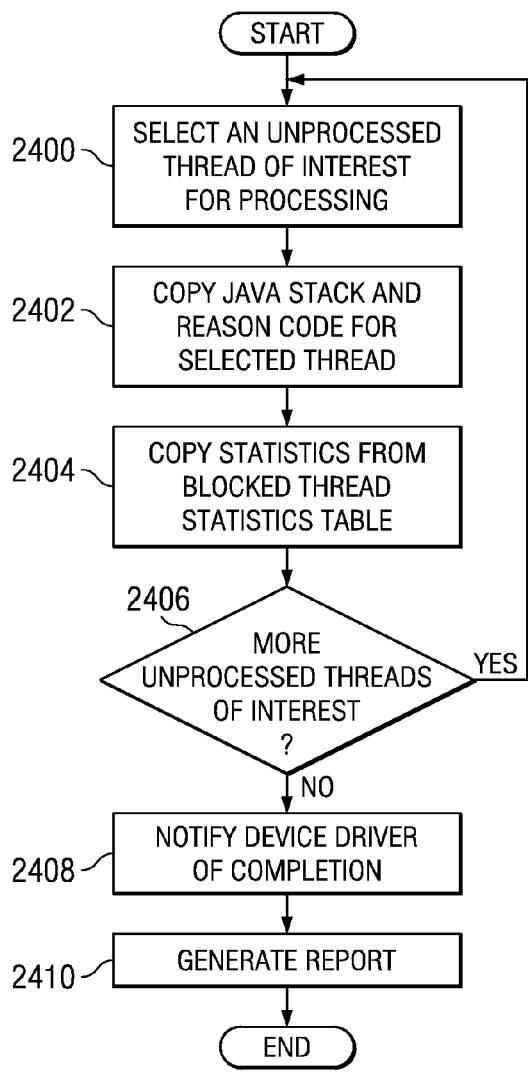
FIG. 24 is a flowchart of a process for collecting data in accordance with an illustrative embodiment.

Turning now to FIG. 24, a flowchart of a process for collecting data is depicted in accordance with an illustrative embodiment. The process illustrated in FIG. 24 is an example of a process that would be implemented in a software component, such as sampling daemon 408 in FIG. 4. This process is initiated when the sampling daemon is woken by the device driver.

The process begins by selecting an unprocessed thread of interest for processing (step 2400). This thread of interest is identified using a policy, such as policy 406 in FIG. 4. Thereafter, the Java stack and the reason code for the selected code are copied (step 2402). This information may be obtained by the process through accessing a data area, such as data area 714 in FIG. 7. Alternatively, or in addition, the process may use an interface to a Java virtual machine, such as interface 420 in FIG. 4 or interface 520 in FIG. 5 to obtain call stack information and more reason codes for each thread of interest.

Depending on the particular implementation, the reason code may be obtained from the operating system, from the Java virtual machine, or from both sources. If reason codes are available from both the operating system and the Java virtual machine, the reason code providing the most detail is used in the analysis in these examples.

The reason code may indicate that a thread is in an idle state or blocked from executing because a resource, such as an I/O interface or device, is unavailable. Another example of a reason that the reason code may return is that a particular file has been locked by another thread causing the current thread to be placed in an idle state to wait for the file to become available.

Thereafter, statistics are copied from the blocked thread statistics table (step 2404). In these examples, the blocked thread statistics table may be blocked thread statistics table 724 in FIG. 7. Next, a determination is made as to whether additional unprocessed threads of interest are present (step 2406). If additional unprocessed threads of interest are present, the process returns to step 2400. In step 2404, the statistics copied from the blocked thread statistics table are for the thread of interest.

If additional unprocessed threads of interest are not present, the process sends a notification to the device driver that the gathering of data has completed (step 2408). Thereafter, the process may generate a report (step 2410) with the process terminating thereafter.

In the depicted examples, a device driver is used to identify when criteria is met for collecting information. In these examples, the device driver identifies when a thread enters or leaves a wait state as well as other statistics about the thread's execution time. Other information about the thread, in these examples, is collected by an interface to a Java virtual machine. In these examples, this other information takes the form of call stacks. Of course, depending on the particular implementation, the different processes implemented in the device driver could be implemented in an interface to the Java virtual machine, such as interface 420 in FIG. 4 or interface 520 in FIG. 5, depending on the particular implementation.

Figure 25:
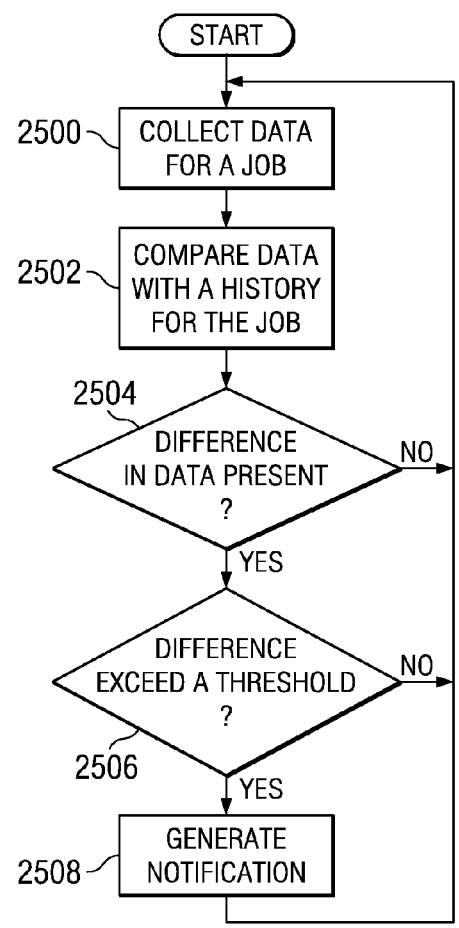
FIG. 25 is a flowchart of a process for comparing executions of jobs to a history in accordance with an illustrative embodiment.

With reference now to FIG. 25, a flowchart of a process for comparing executions of jobs to a history is depicted in accordance with an illustrative embodiment. The process illustrated in FIG. 25 may be implemented in a software component, such as, profiling program 400 in FIG. 4. The process illustrated in FIG. 25 is a real time process in which the comparison of data occurs as the data is collected. Depending on the particular implementation, this process may be performed after all of the data has been collected for a particular job. In these examples, a job is a single instance of a program or application.

The process beings by collecting data for a job (step 2500). In these examples, the data is wait state data, such as wait state data 402 in FIG. 4. Additionally, the data collected also includes idle state data, such as idle state data 404 in FIG. 4, relating to the execution of the job.

The process then compares the data with a history for the job (step 2502). This history is data collected for execution of the job over some period of time. The comparison may include, for example, correlating the time at which the data is collected for the current job with a corresponding time in the history for the job. The correlation also may extend to particular days and months depending on the particular implementation. Thereafter, a determination is made as to whether a difference in the data is present (step 2504).

If no difference in the data is present, the process returns to step 2500. In many cases, some differences may be present. If a difference in the data is present, a determination is made as whether the difference exceeds a threshold or some other criteria (step 2506). If the difference exceeds a threshold, the process generates a notification (step 2508). The notification may be, for example, an entry in a log, a notification presented on a display, or an email message sent to a user. With reference again to step 2506, if a difference in the data does not exceed the threshold, the process returns to step 2500 to continue collecting data. The process in step 2508 also returns to step 2500.

Thus, illustrative embodiments provide a computer implemented method, apparatus, and computer usable program code for collecting information about threads. A thread entering a wait state is detected. Information is selectively obtained about a set of threads in the wait state using a policy in response to the thread entering the wait state Although the depicted examples for the different illustrative embodiments are described with respect to a Java Virtual Machine, the embodiments may be implemented in other types of environments other than a Java Virtual Machine. For example, the embodiments may be implemented in any virtual machine or in an operating system. The embodiments of the present invention may be implemented in any environment in which wait states are present. For example, the described features for the illustrative embodiments may be applied to other constructs or locking mechanisms other than a monitor. The different features may be applied to requesters waiting for operations to complete in any operating environment.

The invention can take the form of an entirely hardware embodiment, an entirely software embodiment or an embodiment containing both hardware and software elements. In a preferred embodiment, the invention is implemented in software, which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, or communicate the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for collecting information about threads, the computer implemented method comprising:
   detecting a thread entering a wait state;
   selectively obtaining information about a set of threads in the wait state using a policy in response to the thread entering the wait state, wherein the policy comprises a set of one or more rules that identify when information about the thread is to be collected;
   counting a number of times that the thread has gone into an idle state, wherein a count is formed, and wherein the count is stored in a node of a tree data structure;
   placing a unique identifier in the node;
   generating a trace record, wherein the trace record contains the unique identifier and the count;
   generating a report based on a combination of the trace record and the tree data structure; and
   analyzing the report to determine why a processor became idle during execution of code that included the thread.

2. The computer implemented method of claim 1, wherein the policy specifies obtaining information about a thread of interest in the set of threads if a number of threads in the set of threads exceeds a threshold when the thread enters the wait state.

3. The computer implemented method of claim 1, wherein the policy specifies obtaining information about the set of threads if a number of threads in the set of threads exceeds a threshold when the thread enters the wait state.

4. The computer implemented method of claim 1, wherein the policy specifies obtaining information about the set of threads if the processor is in an idle state when the thread enters the wait state.

5. The computer implemented method of claim 1, wherein the selectively obtaining step comprises:
   obtaining call stack information about a thread of interest in the set of threads in the wait state using the policy.

6. The computer implemented method of claim 5, wherein the selectively obtaining step further comprises:
   obtaining a reason why the thread of interest in the set of threads entered the wait state using the policy.

7. The computer implemented method of claim 1, wherein the selectively obtaining step comprises:
   obtaining a reason why a thread of interest in the set of threads entered the wait state using the policy.

8. The computer implemented method of claim 1 further comprising:
   analyzing the information about the set of threads to identify a pattern for a reason why threads are in the wait state.

9. A computer implemented method for collecting information about threads, the computer implemented method comprising:
   detecting a thread entering a wait state;
   responsive to detecting the thread entering the wait state, determining whether a number of threads in the wait state exceeds a threshold;
   responsive to a determination that the number of threads exceeds the threshold, sending a request to an interface of a virtual machine to obtain stack information of the number of threads;
   collecting the stack information for the number of threads in the wait state when the number of threads exceeds the threshold; and
   identifying a reason why the thread entered the wait state, wherein the identifying comprises:
      obtaining a first reason from an operating system in which the thread is executing and a second reason from a virtual machine in which the thread is executing; and
      selecting one of the first reason and the second reason to form the reason why the thread entered the wait state.

10. The computer implemented method of claim 9, wherein the collecting step comprises:
    collecting the stack information for a thread of interest in the number of threads in the wait state if the number of threads exceeds the threshold.

11. The computer implemented method of claim 9, wherein the collecting step is performed by a profiling program.

12. A computer program product comprising:
    a computer usable medium having computer usable program code for collecting information about threads stored thereon for execution by one or more processors, the computer program product comprising:

computer usable program code for detecting a thread entering a wait state;
computer usable program code for selectively obtaining information about a set of threads in the wait state using a policy in response to the thread entering the wait state, wherein the policy comprises a set of one or more rules that identify when information about the thread is to be collected;
computer usable program code for counting a number of times that the thread has gone into an idle state, wherein a count is formed, and wherein the count is stored in a node of a tree data structure;
computer usable program code for placing a unique identifier in the node;
computer usable program code for generating a trace record, wherein the trace record contains the unique identifier and the count;
computer usable program code for generating a report based on a combination of the trace record and the tree data structure; and
computer usable program code for analyzing the report to determine why a processor became idle during execution of code that included the thread.

13. The computer program product of claim 12, wherein the policy specifies obtaining information about a thread of interest in the set of threads if a number of threads in the set of threads exceeds a threshold when the thread enters the wait state.

14. The computer program product of claim 12, wherein the policy specifies obtaining information about the set of threads if a number of threads in the set of threads exceeds a threshold when the thread enters the wait state.

15. The computer program product of claim 12, wherein the policy specifies obtaining information about the set of threads if the processor is in an idle state when the thread enters the wait state.

16. The computer program product of claim 12, wherein the computer usable program code for selectively obtaining information about a set of threads in the wait state using a policy in response to the thread entering the wait state comprises:
computer usable program code for obtaining call stack information about a thread of interest in the set of threads in the wait state using the policy.

17. The computer program product of claim 16, wherein the computer usable program code for selectively obtaining information about a set of threads in the wait state using a policy in response to the thread entering the wait state further comprises:
computer usable program code for obtaining a reason why the thread of interest in the set of threads entered the wait state using the policy.

18. The computer program product of claim 12, wherein the computer usable program code for selectively obtaining information about a set of threads in the wait state using a policy in response to the thread entering the wait state comprises:
computer usable program code for obtaining a reason why a thread of interest in the set of threads entered the wait state using the policy.

19. The computer program product of claim 12 further comprising:
computer usable program code for analyzing the information about the set of threads to identify a pattern for a reason why threads are in the wait state.

20. A data processing system comprising:
a bus;
a communications unit connected to the bus;
a storage device connected to the bus, wherein the storage device includes computer usable program code; and
a processor unit connected to the bus, wherein the processor unit executes the computer usable program to:
detect a thread entering a wait state;
selectively obtain information about a set of threads in the wait state using a policy in response to the thread entering the wait state, wherein the policy comprises a set of one or more rules that identify when information about the thread is to be collected;
count a number of times that the thread has gone into an idle state, wherein a count is formed, and wherein the count is stored in a node of a tree data structure;
place a unique identifier in the node;
generate a trace record, wherein the trace record contains the unique identifier and the count;
generate a report based on a combination of the trace record and the tree data structure; and
analyze the report to determine why the processor unit became idle during execution of code that included the thread.

21. The data processing system of claim 20, wherein the policy specifies obtaining information about a thread of interest in the set of threads if a number of threads in the set of threads exceeds a threshold when the thread enters the wait state.

22. The data processing system of claim 20, wherein the policy specifies obtaining information about the set of threads if a number of threads in the set of threads exceeds a threshold when the thread enters the wait state.

23. The data processing system of claim 20, wherein the policy specifies obtaining information about the set of threads if the processor unit is in an idle state when the thread enters the wait state.

24. The data processing system of claim 20, wherein in executing the computer usable program code to selectively obtain information about a set of threads in the wait state using a policy in response to the thread entering the wait state the processor unit executes the computer usable program code to obtain call stack information about a thread of interest in the set of threads in the wait state using the policy.

25. The data processing system of claim 24, wherein in executing the computer usable program code to selectively obtain information about a set of threads in the wait state using a policy in response to the thread entering the wait state the processor unit further executes the computer usable program code to obtain a reason why the thread of interest in the set of threads in the wait stating using the policy.

26. The data processing system of claim 20, wherein in executing the computer usable program code to selectively obtain information about a set of threads in the wait state using a policy in response to the thread entering the wait state the processor unit executes the computer usable program code to obtain a reason why a thread of interest in the set of threads entered the wait state using the policy.

27. The data processing system of claim 20 wherein the processor unit further executes the computer usable program code to analyze the information about the set of threads to identify a pattern for a reason why threads are in the wait state.

28. A computer program product comprising:
a computer usable medium having computer usable program code for collecting information about threads stored thereon for execution by one or more processors, the computer program product comprising:
computer usable program code for detecting a thread entering a wait state;

computer usable program code for, responsive to detecting the thread entering the wait state, determining whether a number of threads in the wait state exceeds a threshold;

computer usable program code responsive to a determination that the number of threads exceeds the threshold, sending a request to an interface of a virtual machine to obtain stack information of the number of threads;

computer usable program code for collecting the stack information for the number of threads in the wait state when the number of threads exceeds the threshold; and computer usable program code for identifying a reason why the thread entered the wait state, wherein the identifying comprises:

computer usable program code for obtaining a first reason from an operating system in which the thread is executing and a second reason from a virtual machine in which the thread is executing; and computer usable program code for selecting one of the first reason and the second reason to form the reason why the thread entered the wait state.

\* \* \* \* \*